US008929912B1

(12) United States Patent
Chitre et al.

(10) Patent No.: US 8,929,912 B1
(45) Date of Patent: Jan. 6, 2015

(54) ADDRESS VALIDATION FOR PERSONAL EMERGENCY RESPONSE SYSTEMS (75) Inventors: Monica Anilkumar Chitre, Watchung, NJ (US); Peter Charles Bates, Morristown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 275 days.

(21) Appl. No.: 13/087,088

(22) Filed: Apr. 14, 2011

(51) Int. Cl.
H04W 24/00 (2009.01)

(52) U.S. Cl.
USPC ..................................... 455/456.1

(58) Field of Classification Search
CPC ... H04L 2463/102; H04L 63/02; H04L 67/22; H04L 12/1482
USPC .............................. 455/456.1–466
See application file for complete search history.

(56) References Cited

U.S. PATENT DOCUMENTS

| | | | |
|---|---|---|---|
| 6,678,357 B2 | 1/2004 | Stumer et al. | |
| 7,945,034 B2 * | 5/2011 | Gonen et al. | 379/142.05 |
| 8,401,003 B1 * | 3/2013 | Petit-Huguenin et al. | 370/352 |
| 2003/0156477 A1 | 8/2003 | Morgan et al. | |
| 2005/0213716 A1 | 9/2005 | Zhu et al. | |
| 2006/0154661 A1 * | 7/2006 | Gonen et al. | 455/435.1 |
| 2007/0211692 A1 * | 9/2007 | Boroski et al. | 370/351 |
| 2007/0230374 A1 * | 10/2007 | Altberg et al. | 370/271 |
| 2007/0242626 A1 * | 10/2007 | Altberg et al. | 370/259 |
| 2009/0041011 A1 * | 2/2009 | Sheppard | 370/360 |
| 2009/0240554 A1 * | 9/2009 | Oswald et al. | 705/9 |
| 2009/0312022 A1 | 12/2009 | Viorel et al. | |
| 2010/0248683 A1 | 9/2010 | Terpstra | |
| 2011/0145273 A1 * | 6/2011 | Kolathaya et al. | 707/769 |
| 2011/0287733 A1 * | 11/2011 | Cepuran et al. | 455/404.1 |
| 2012/0113899 A1 * | 5/2012 | Overmars | 370/328 |

* cited by examiner

Primary Examiner — Fan Ng (57) ABSTRACT

A server verifies that an address of record for a personal emergency response (PERS) device is in agreement with a current address of the PERS device. The PERS device has a docking station and a wearable unit. At start-up, the docking station places a call to the server and the server receives coordinates of the wearable unit. The coordinates are reverse-mapped into the current address and compared with the address of record. If the current address and the address of record differ, the address of record is updated to reflect the current address.

20 Claims, 8 Drawing Sheets

ADDRESS VALIDATION FOR PERSONAL EMERGENCY RESPONSE SYSTEMS

TECHNICAL FIELD

The present subject matter relates to techniques and equipment to determine an address of a communication device that may be moved from one address to another for telecommunication via different landlines and to obtain and/or validate the address associated with the device.

BACKGROUND

In recent years, Personal Emergency Response Systems (PERS) have increasingly provided users with an elevated level of safety and security. PERS devices and equipment are user-installed devices attached to a landline network. Installation of a new PERS device and service is tied to user-provided information, such as address and telephone number. The general concept is that the PERS user is able to, with a single button press on a wearable unit, alert an emergency response call center that they are in distress and need immediate assistance. Some PERS devices, referred to as mobile PERS or mPERS, have wireless capability, allowing for the wearable unit to be active over extended range as compared to traditional PERS devices. Some PERS devices are capable of detecting events such as falls or extended periods of inactivity and alert the call center to these conditions. Regardless of the specific type of PERS device, upon activation of the PERS device, the appropriate response personnel are contacted and dispatched to the address of record for the user.

In the event that the address of record is inaccurate, personnel may be sent to the wrong address, leaving the user in distress. Inaccuracies in the address of record may occur for a number of reasons. For example, on installation of the PERS device, the user could inadvertently supply an incorrect address when the service is purchased. Other inaccuracies may occur when the user installs the device at an address different from the address for which the device was initially registered, or when the user understands the street address assigned to the landline to be different from the address used by emergency personnel upon dispatch. Normally, landline telephone numbers are registered with a municipal street address in a Master Street Guide (MSAG) database used by emergency personnel when responding to an emergency call. Such databases can contain errors due to changes in street numbering plans, typographical errors in entries, changes in emergency service zones (which emergency services are responsible for specific street addresses), and changes to landlines assigned to the street address.

Traditionally, PERS devices connected to PSTN type landlines. Automatic Number Identification (ANI) or caller Identification (caller ID) of the landline provided for an identification for an accurate address lookup in most cases. Even if the user moves the device to a new home, the new caller ID or ANI would provide an accurate identification for address lookup at the new location. However, increasingly, users are connecting PERS devices to alternative types of landline networks, which may or may not provide accurate address lookup capabilities.

For example, as Voice over Internet Protocol (VoIP) becomes increasingly popular, inaccuracies in the address of record for the associated equipment (e.g., VoIP Analog Terminal Adapter (ATA), sometimes referred to as a Media Terminal Adapter (MTA)) may not reflect the actual address of the equipment. When the user moves a PERS device along with an ATA to another broadband connection, the PERS device keeps the same telephone number. A lookup based on ANI or caller ID would return the old address, creating problems with location-based services such as PERS service and E911.

Hence, a need exists for ensuring the address of record reflects the actual address of the user of a moveable landline device, such as a PERS device.

SUMMARY

The teachings herein alleviate one or more of the above-noted problems with incorrect or inaccurate addresses in association with PERS devices and VoIP apparatus.

In some examples, a moveable landline device is used in conjunction with a VoIP adapter to initiate a VoIP telephone call to a server over the Internet. In response to a telephone number associated with the origin of the telephone call, the server may obtain an address associated with the moveable landline device. In some examples, the call may be placed at startup of the moveable landline device. The server may request address verification for the moveable landline device from a wireless network servicing a wireless device within proximity of the moveable landline device. In response to the request for address verification, the server may receive address information for the wireless device. In some examples, address information for the wireless device may be obtained by receiving coordinates from the global positioning system and reverse-mapping the coordinates into an address. The server may then compare the address information for the wireless device and the address associated with the moveable landline device to determine whether or not the address of the moveable landline device is accurate. In some examples, when the address is determined to be inaccurate, the user of the wireless device is requested to provide accurate address information and the address associated with the moveable landline device is updated to include the user provided address information. In some examples, the moveable landline device is a docking station of a PERS system and the wireless device is a wearable unit of a PERS system (e.g., an mPERS system). The docking station may include a low-power radio transceiver for communication with the wearable unit when the wearable unit is not docked in the docking station.

In certain examples, a moveable landline device places a call to a central processing system at start-up of the moveable landline device. In some examples, an address associated with a telephone number may be obtained responsive to the telephone number associated with the received call. The central processing system receives coordinates of a wearable unit in radio communication with the moveable landline device. The coordinates are obtained from the global positioning system and reverse-mapped into a current address of the moveable landline device. The address associated with the telephone number may be compared with the current address obtained via reverse-mapping. If the comparison indicates a difference, a user of the wearable unit may be requested to verify the current address. In some examples, the centralized processing system is a personal emergency response system call center and such verification may be in the form of a call center agent placing a call to the user. The current address is stored in the central processing system in association with an identifier of the moveable landline device. This stored current address may then be used during processing of a further call for the moveable landline device.

In some examples, a system has an interface for communication with mobile stations through a mobile communication network, a processor for controlling operations of a server, including communications through the interface, and storage for user records and programming executable by the processor. The programming configures the processor so that the system is capable of implementing functions, including functions to receive a call from a moveable landline device, and receive coordinates of a wearable unit in radio communication with the moveable landline device. Such coordinates may be obtained from the global positioning system. The programming configures the processor so that the system is capable of implementing functions to reverse-map the received coordinates into a current address of the moveable landline device, and to store the current address of the moveable landline device in the central processing system in association with an identifier of the moveable landline device, for determining location of the moveable landline device during processing of a further call for the moveable landline device.

As a result, addresses may be verified in a manner to allow for accurate dispatch of emergency and other services.

Additional advantages and novel features will be set forth in part in the description that follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A critical component of the emergency services provider network is an accurate database that maps addresses to moveable landline devices used to contact emergency services. Many landline telephones are identified by their telephone number. The location of the telephone number is given by the MSAG, which ties the telephone number to an address (e.g., a municipal street address, GPS coordinates, or other indicator of position). Mobile telephones are located increasingly by GPS coordinates obtained from the device and delivered to a call center when an emergency call is placed. In some instances (e.g., mPERS), mobile cellular technology is used to increase coverage area and provide redundant routes to emergency services call takers.

To accurately direct emergency services, it is desirable to verify that the address of record matches the current address of the user. Additionally, it may be desirable to verify that the address of record matches the MSAG address associated with the telephone number.

The disclosure below illustrates unique characteristics of the PERS service to validate that the MSAG and user-supplied addresses associated with a PERS device are correct, have the proper telephone numbers, the PERS device is located at its registered address, and the PERS wearable unit is properly associated with the docking station and address. In particular, it uses Assisted GPS (A-GPS) to accurately and quickly locate the device, validate the municipal address assigned to the device, and ensure the accuracy of the service identifiers that are used to lookup user address information in emergencies.

Figure 1:
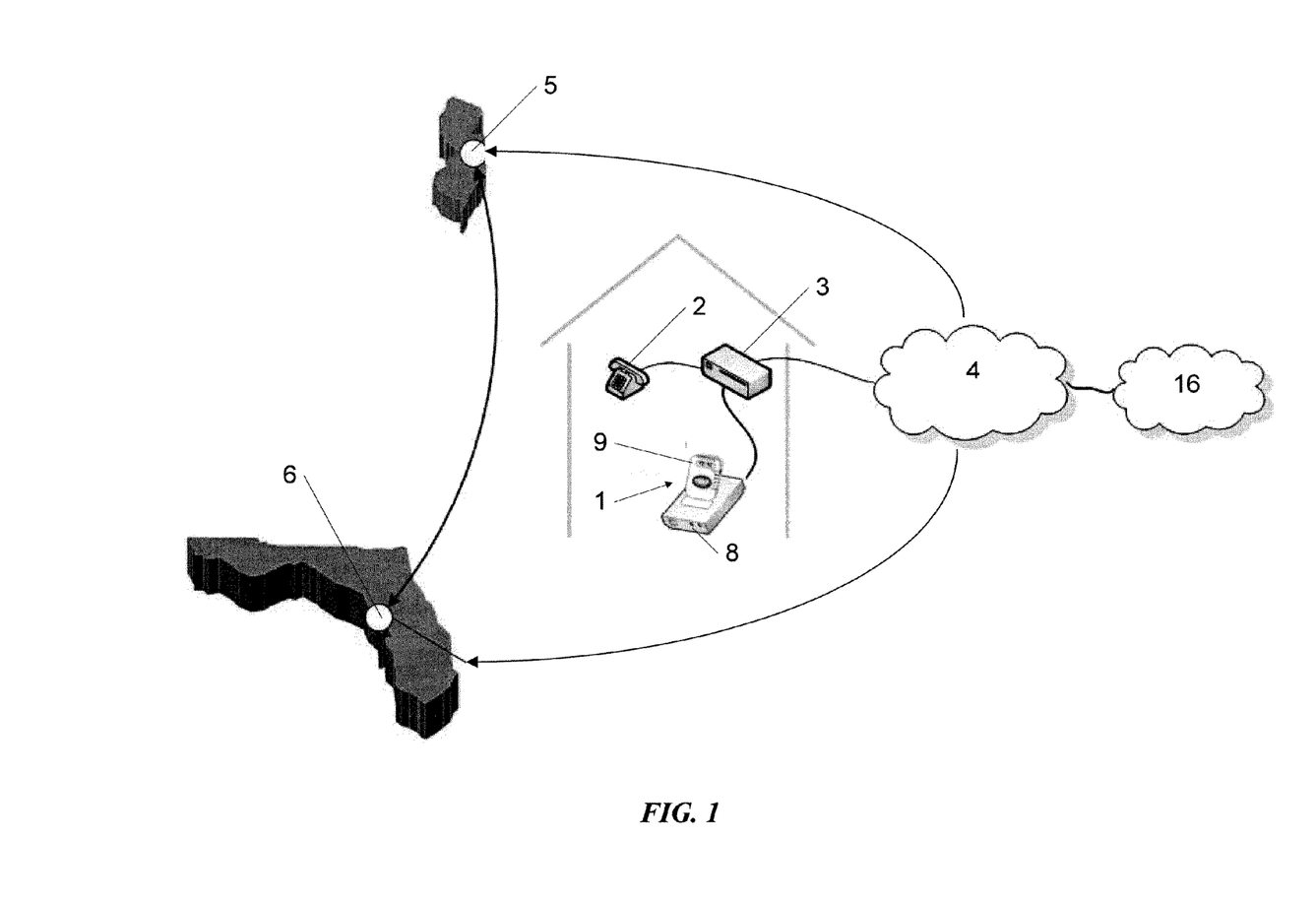
FIG. 1 illustrates an exemplary PERS device used in conjunction with a third party VoIP service.
Figure 3:
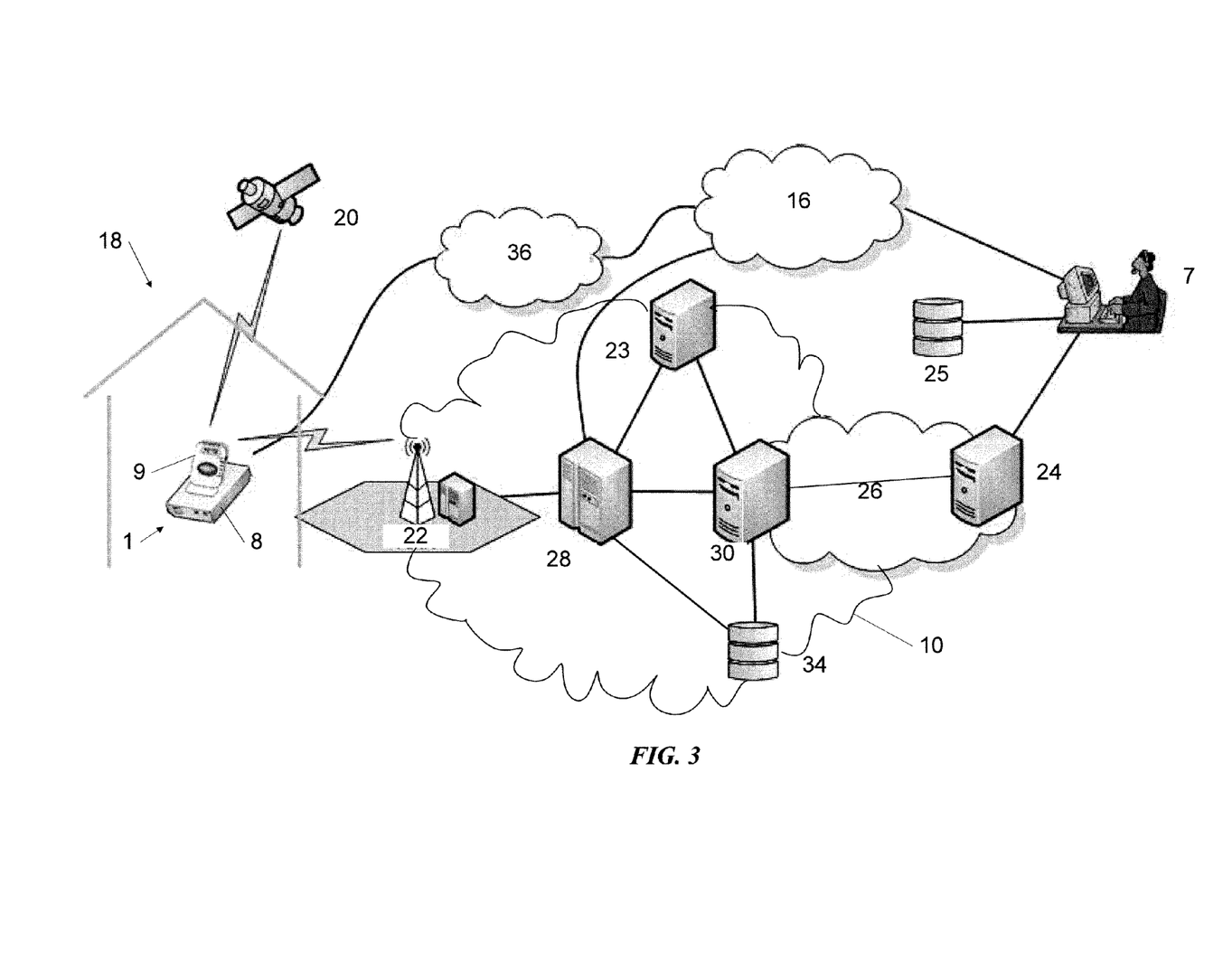
FIG. 3 is a simplified functional diagram of a PERS validation system that may perform address validation.

Reference now is made in detail to the examples illustrated in the accompanying drawings and discussed below. Referring now to FIG. 1, a moveable landline device, such as a PERS device 1 or a telephone 2 may be used in conjunction with a third party VoIP service. In such instances, a landline telephone number may not be tied to an address, but instead is assigned to an ATA 3. However, verification of the address of a caller from the connection may still be desirable, whether for e911, for use with PERS devices, or for other purposes. Because the ATA 3 provides the moveable landline device (e.g., the PERS device 1) with telephone service anytime the user connects the ATA 3 to the Internet through a broadband access network 4, the telephone number associated with the ATA 3 may not be indicative of the address at all. For example, as illustrated, the device may have two or more service addresses, such as a summer address 5 in New Jersey and a winter address 6 in Florida. The telephone number of the ATA 3 may be assigned by the third party VoIP service provider as a New Jersey number. The assigned telephone number of the ATA 3 may remain the same as the ATA 3 is moved from one address to another (e.g., from the summer address 5 in one state to the winter address 6 in another state). The ATA 3 may register with the VoIP service provider's service through the local broadband access network 4 at each address, without notification of any change in address. Thus, a party, such as call center 7 (e.g., as illustrated in FIG. 3), called via the VoIP service, may not be able to determine the actual address of the moveable landline device (e.g., the PERS device 1) based on a lookup of the ANI or caller ID.

After the user has moved the ATA 3 to a new address, the moveable landline device, such as a docking station 8 of the PERS device 1, may be connected and powered or otherwise go through startup. In one example, the docking station 8 and an associated wearable unit 9 interact with the call center 7 (e.g., as illustrated in FIG. 3) via ATA 3. In one example, other moveable landline device(s), such as telephone 2, may place a telephone call at startup of the moveable landline device(s), initiating an address verification process. If the verification process indicates that the docking station 8 or other moveable landline device is at a new address, the call center 7 may obtain the new address either directly from the user, from the user's caregiver, or otherwise. Likewise, if the verification process indicates that the wearable unit 9 is located at a new address, it may be presumed that the docking station 8, which is within range of the wearable unit 9, has also moved. Such an indication may cause the call center agent to obtain the new address, for example, by contacting the user of the PERS device 1 to verify the address. The user may affirm that the docking station 8 and the user have moved to the new address and that the user desires PERS service at that address.

Figure 2:
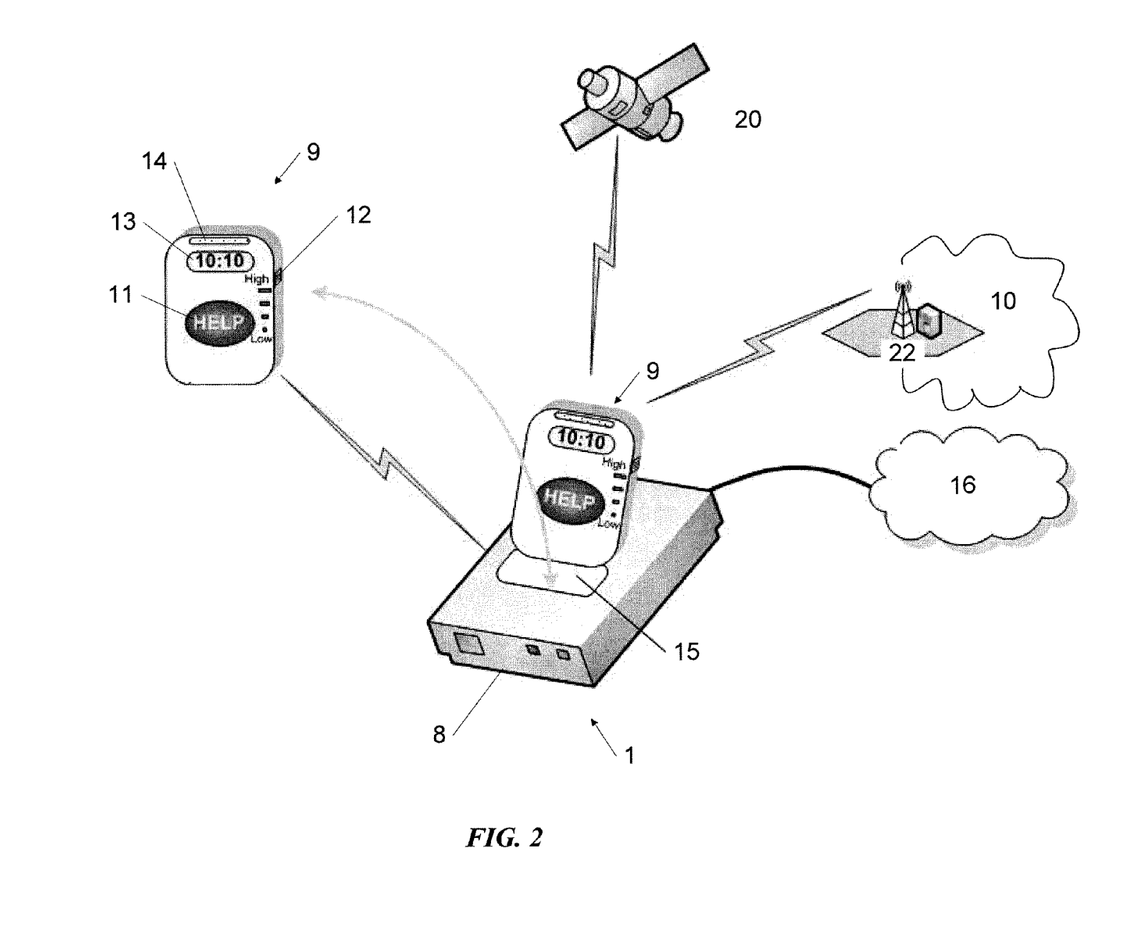
FIG. 2 illustrates an exemplary PERS device having a docking station and one or more wearable units.

Referring now to FIG. 2, the moveable landline device may be a PERS device 1 and include the docking station 8, which may be associated with one or more wearable units 9. Such a moveable landline device may be used in PERS applications, allowing the user to alert the call center 7 (for example, as illustrated in FIG. 3) to an emergency and provide precise address information. Generally, when the wearable unit 9 is within a particular range (e.g., 100'-300') of the docking station 8, the wearable unit 9 can be used to communicate via the docking station 8. When the wearable unit 9 is beyond the range, or if power to the docking station 8 fails, the wearable unit 9 may communicate through the wireless network 10, when the PERS device 1 is an mPERS device.

The wearable unit 9 may be carried by the user in any of a number of ways, including but not limited to, as a lanyard around the user's neck, as a clip-on attachment to the user's belt, in the user's pocket, and the like. Alternatively, the wearable unit 9 may not be "worn," but may be otherwise within the proximity of the user. The wearable unit 9 may have a "help," or other type of call button 11 that can be actuated when emergency assistance is needed. The wearable unit 9 may also have a volume control 12 to raise or lower sound volume of a speaker and/or microphone (neither shown), display 13, and/or indicator light(s) 14 to indicate various states and conditions, such as time of day and battery charge. The audio speaker and microphone may enable two-way voice communication between the wearable unit 9 and the call center 7, upon initiation of a call from wearable unit 9. Additionally, the wearable unit 9 may include a GPS receiver (not shown), a low-power RF transceiver for communication with the docking station 8, and a mobile cellular radio (not shown), such as Code Division Multiple Access (CDMA), Global System for Mobile Communications (GSM), Universal Mobile Telecommunications System (UMTS), etc. The cellular radio may allow for communication through the wireless network 10 when the wearable unit 9 is outside the range of the docking station 8. Additionally, the wearable unit 9 may contain a GPS receiver, and the cellular radio may avail the user of the A-GPS positioning services using a GPS network 20.

The docking station 8 may have a physical, powered port 15 for recharging batteries (not shown) of the wearable unit 9 and to ensure affinity of the wearable unit 9 and the docking station 8. In one example, the docking station 8 is powered by regular AC power lines or MAINS within the premises, i.e., line power, and connects to a landline or is otherwise directly or indirectly connected to the PSTN 16. The docking station 8 may have a microphone and speaker (not shown), allowing for audio capabilities, similar to those of the wearable unit 9. The docking station 8 may have a low power RF transceiver for communication with the wearable unit 9 when wearable unit 9 is not in physical communication with port 15.

FIG. 3 illustrates an overview of the PERS validation system 18, according to one example. The PERS validation system 18 may include the wearable unit 9 and the docking station 8 connected to a fixed landline telephone line or fixed broadband ATA 3, either of which has an associated telephone number registered at an address database. If present, fixed broadband ATA 3 access may include cable-modem networks typical of cable services providers or fixed-wireless networks deployed by wireless and traditional telephony service providers.

When the PERS device 1 is an mPERS, the PERS validation system 18 may also include a GPS network 20 to provide accurate location fixes, a Radio Access Network (RAN) 22 for mobile cellular connectivity and A-GPS position fixes, a position determining entity (PDE) 23 that may use a control plane (or user plane) location determining algorithm, and a location server 24 that may allow access to the PDE 23. Additionally, the PERS validation system 18 may include or communicate with a MSAG 25 or other database to provide mappings between the telephone number and addresses, and a central processing system (e.g., call center 7) that may perform validation testing and updates to the MSAG 25. The call center 7 may contain application servers, databases, connections to a PSTN 16 or other landline or Fixed-Line Telephony Network, and to a location server 24 having a location service (LCS), which has access to the PDE 23 of the wireless network 10 (via Internet 26 or otherwise), and may perform the validation function. One or more agents at the call center 7 may monitor the validation process, or an automated system may perform the same tasks.

Referring still to FIG. 3, the docking station 8 may be connected to a fixed landline assigned to an address and terminating at that particular address. The wearable unit 9 may be associated with the docking station 8 and configured to communicate through the wireless network 10. The wireless network 10 may include the RAN 22, a Mobile Switching Center (MSC) 28, the PDE 23, a Mobile Positioning Center (MPC) 30, and various registration databases, such as Visiting Location Registry (VLR) (not shown) and Home Location Registry (HLR) 34, used by the wireless network 10 to manage communications of mobile devices.

The MSC 28 is sometimes referred to as a "switch." The MSC 28 is responsible for managing communications between the PERS device 1 and the other elements of the network 10. In addition, the MSC 28 is responsible for handling voice calls and messaging service message requests as well as other services (such as conference calls, FAX and circuit switched data, messaging service communications, Internet access, etc.). The MSC 28 sets up and releases the end-to-end connection or session, and handles mobility and hand-over requirements during the call.

The PDE 23 and MPC 30 enable location-based services. The PDE 23 utilizes different techniques to provide a reliable position location for the PERS device 1 and other mobile devices serviced by network 10. In one scenario, in which PERS device 1 has a clear view of the sky, PDE 23 uses GPS signals for position determination. If PERS device 1 does not receive sufficient GPS signals, PDE 23 uses a combination of GPS and a pilot signal provided by a Base Transceiver System (BTS), which serves as a hub for radio communications and may support sub-layers of an air-link protocol carried for transmitting and/or receiving data packets from the mobile device. The MPC 30 is a gateway between the mobile network and the PDE 23 and is configured to request location information from PDE 23.

The HLR 34 stores data regarding the valid stations' identifications, the assigned telephone numbers, subscription service options, terminal capabilities, etc. The information in the HLR 34 is used to provide the subscribed services to each user's mobile device, while the mobile device is operating in the service area of its home network 10. The VLR is used to facilitate roaming and attendant registration. As the mobile device roams, a mobile device registers in service areas other than the service area of the home network 10. The mobile device registers with service areas of a visited network. To do so, the mobile device will register with the VLR. The VLR interacts with the HLR 34 to validate the roaming mobile device. For a validated mobile device and during a successful registration process, service information is downloaded from the HLR 34 to the VLR in a visited network. The validation process also provides information to the HLR 34 indicating the current location of the mobile device in this case, within the visited network, to allow the home network 10 to route incoming voice calls to the mobile device at its current location. The VLR-HLR communications typically utilize SS7 signaling via one or more Signal Transfer Points (STPs).

When an emergency call is initiated from the PERS device 1, a notification may be sent through a Telephony Services Access Network 36 (e.g., cable modem or fiber optic based broadband access network) to the PSTN 16 and then to the call center 7, which has access to the MSAG 25 and can map landline ANI numbers to addresses. Thus, in response to an originating telephone number associated with a telephone call, the location server 24 can obtain an address associated with the PERS device 1 or other moveable landline device, such as telephone 2. In one example, this involves obtaining, from the telephone call, an identifier separate from the telephone number (e.g., ANI or caller ID) associated with the origin of the telephone call and referencing a database (e.g., MSAG 25) to identify the address associated with the identifier and reflecting a first address. In other examples, obtaining the address associated with a moveable landline device, such as PERS device 1 may involve referencing a registration or other user database for determination of the address provided by the user at registration.

Figure 4:
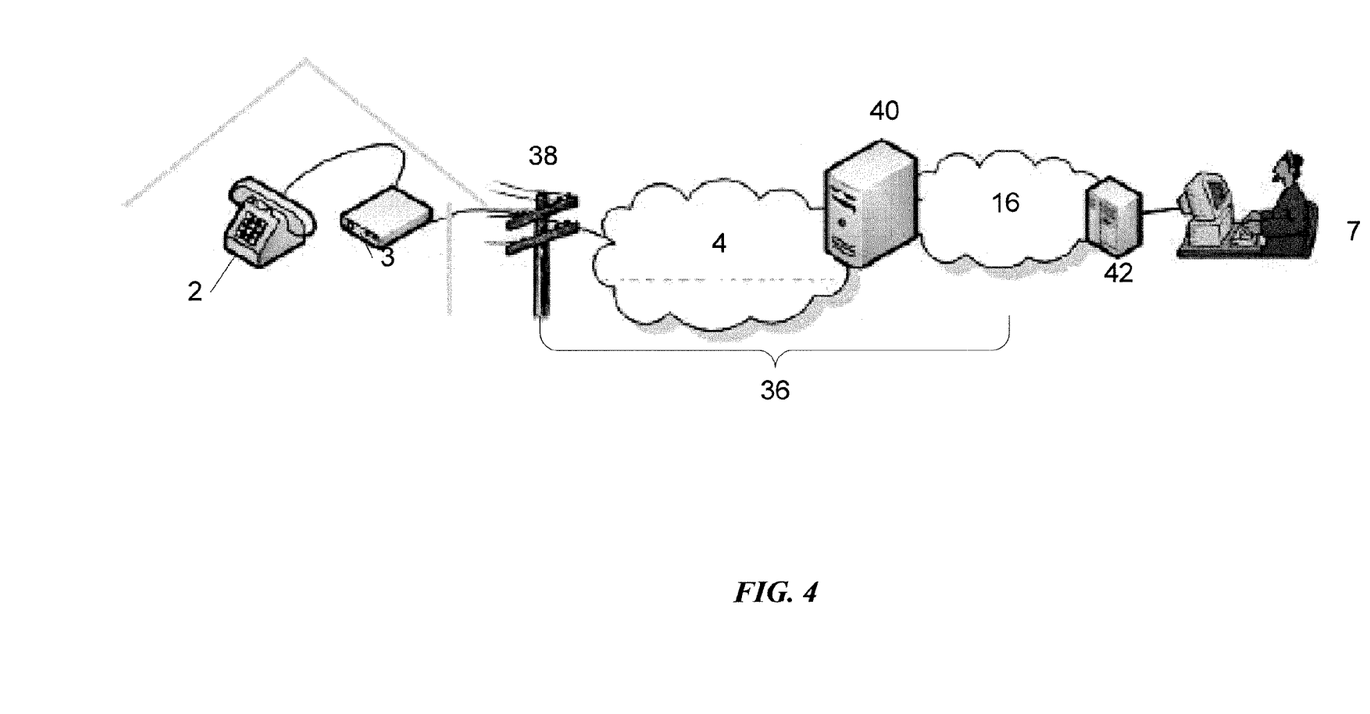
FIG. 4 is a simplified functional diagram illustrating an interconnection between a moveable landline device and a Public Switched Telephone Network (PSTN) when a cable modem or fiber optic based broadband access network is present.
Figure 5:
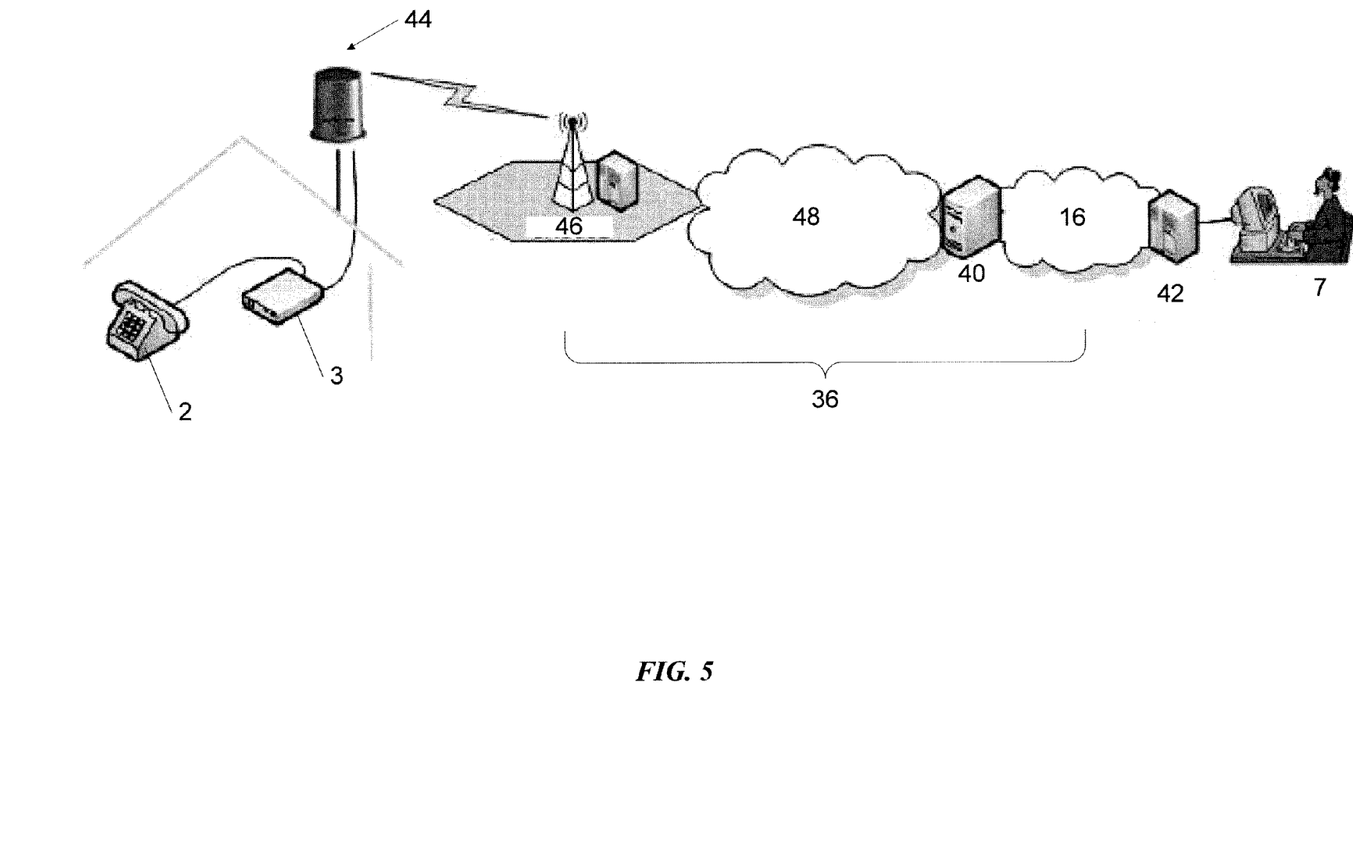
FIG. 5 is a simplified functional diagram illustrating an interconnection between a moveable landline device and a PSTN when an antenna system is present.

Referring now to FIGS. 4 and 5, Telephony Services Access Network 36 may be implemented and deployed using varied technologies. FIGS. 4 and 5 illustrate various examples of interconnections between a moveable landline device, such as the ATA 3, and the PSTN 16. As illustrated, the ATA is connected to the telephone 2. While traditional analog telephone equipment may be used in conjunction with the moveable landline device, other equipment, such as the PERS device 1 having a docking station 8 and associated unit, such as wearable unit 9 (for example, as illustrated in FIG. 2) may be used in a similar fashion. In one example, the ATA 3 may be any VoIP adapter having an assigned telephone number and being configured to provide the telephone 2 with a telephony service over the Internet.

As illustrated in FIG. 4, cable modem or fiber optic based broadband access networks may permit attachment of traditional analog telephone equipment, including a PERS device, via ATA 3. The ATA 3 may be configured to operate only in the location in which it was installed by the service provider. Certain third party VoIP ATA devices require only Internet access to provide telephony services. Thus, the ATA 3 may be moved to any Internet attachment location. Thus, a VoIP telephone call may originate at any moveable landline device, such as telephone 2, connected to the ATA 3, pass through ATA 3, fixed line 38, broadband access network 4, media gateway system 40, PSTN 16, a class 5 switch 42, to call center 7.

As illustrated in FIG. 5, fixed wireless broadband access may operate in a similar fashion, but with a wireless broadband access link provided by an antenna system 44, which may be permanently mounted on the building structure in which service is available. In this example, the call may originate at the telephone 2, pass through the ATA 3, the antenna system 44, a base station 46, a mobile operator Evolved Packet Core/IP Multimedia Subsystem (EPC/IMS) service network 48, the media gateway system 40, the PSTN 16, the class 5 switch 42, to call center 7. In the examples of FIGS. 4 and 5, the moveable landline device may include the phone 2 and/or the PERS device 1 with docking station 8 connected to the ATA 3 which may be interconnected to broadband service. However, in various PERS examples, the ATA 3 is not required to connect docking station 8 to call center 7.

When a user acquires a moveable landline device for use in PERS applications, and initiates a monitoring service, the user may provide information regarding the address of the docking station 8, associated landline telephone number assigned to that address, and a Mobile Directory Number (MDN) of the wearable unit 9. Such information may be stored in the MSAG 25 for later use by call center 7 (e.g., when an emergency call comes in from the user). If the user moves the docking station 8 and associated wearable unit(s) 9 to another address, the information in the MSAG 25 may be updated prior to an emergency call. Various events may trigger an attempt to update the information. For example, the user may call the call center 7 with updated information. In an alternative example, the call center 7 may verify information periodically, for example, the information may be verified by polling the PERS for location information which triggers address verification upon the passage of a predetermined period of time such as a week or a month since the last verification. Additionally, more passive methods may be used to verify the information when the docking station 8 and/or wearable unit 9 may have been moved to another address. For example, the powering up after powering down of the docking station 8 or the docking of the wearable unit 9 with the docking station 8 may trigger address verification.

In one example, each time the docking station 8 is powered on, either from a cold start, restart after power failure, or deliberate turning off, the docking station 8 will attempt to register with the call center 7 and verify its address. Such capabilities may allow the call center 7 to be more efficient by having an indication of the connection status of the docking station 8 and wearable unit 9. Additionally, such capabilities may alert the call center 7 to a change in address by the docking station 8 and/or wearable unit 9, allowing the MSAG 25 to be updated prior to an emergency call, which may save valuable time in responding.

Figure 6A:
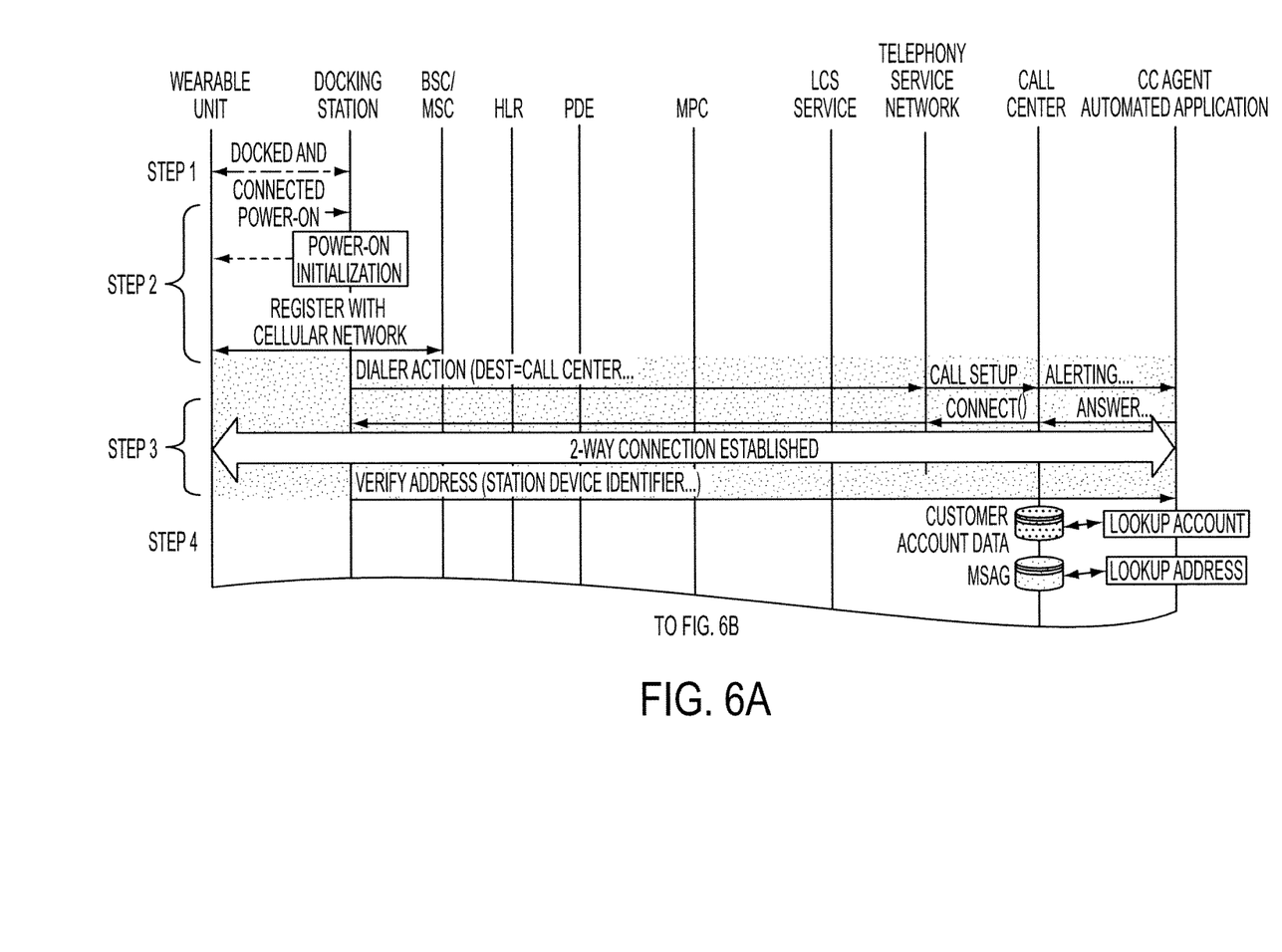
FIGS. 6A and 6B are a functional diagram of an address verification process.
Figure 6B:
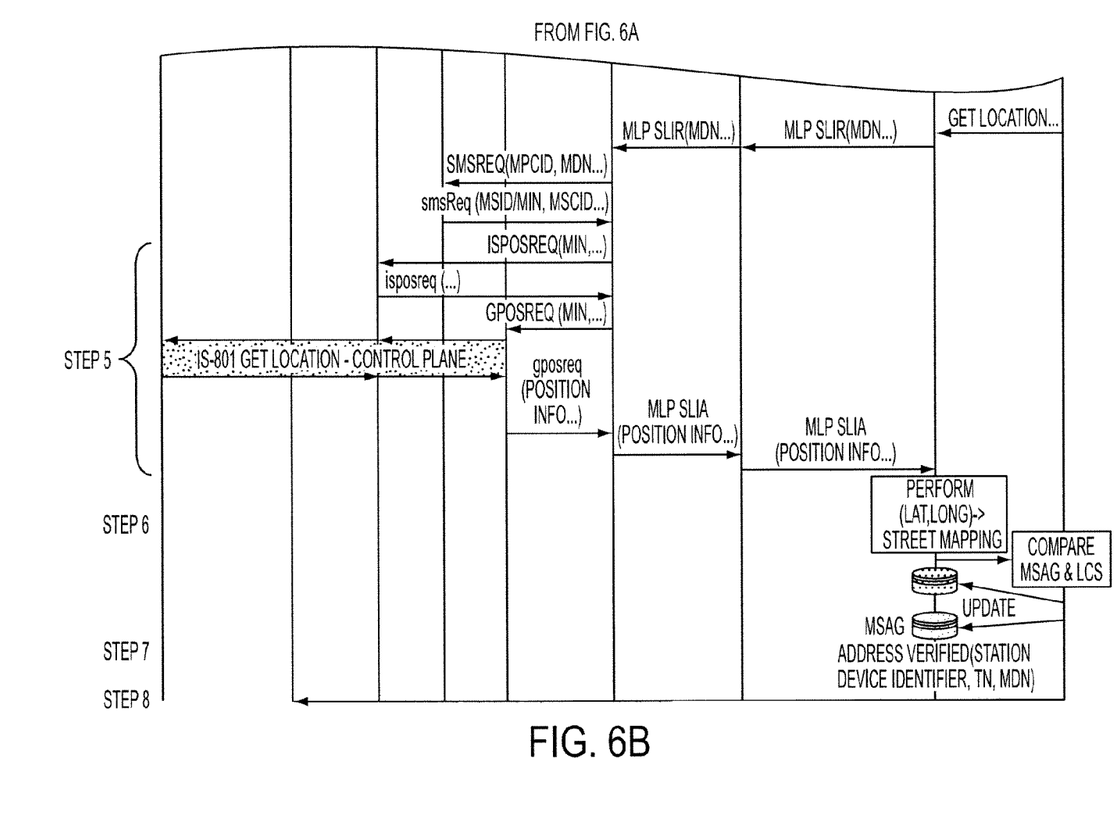

An example of the verification process is illustrated in FIGS. 6A and 6B. At step 1, the user inserts the wearable unit 9 into the port 15 on the docking station 8 and connects the docking station 8 to a landline, which may ensure that the wearable unit 9, the docking station 8, and landline are all correlated at system startup. In the event the wearable unit 9 is not in the port 15, but is within range of RF communication and has previously been involved in a validation process, GPS coordinates of the wearable unit 9 may be compared with the address stored in the MSAG 25 to determine whether the address is within the range of error for the GPS fix. If the wearable unit 9 is outside the RF communication range of the docking station 8, the docking station 8 will wait until the wearable unit 9 enters the range before attempting to re-register. If the wearable unit 9 has not previously been involved in the validation process, the docking station 8 will wait for the wearable unit 9 to contact the port 15 before attempting registration.

At step 2, the user powers or otherwise starts up the docking station 8, which also applies power to and charges the wearable unit 9. Upon startup with the wearable unit 9 present, the docking station 8 executes an internal startup process and initiates a dialer action, attempting to place a telephone call to the call center 7 at a predetermined number (e.g., a toll-free number). When the wearable unit 9 receives power, it will connect to the wireless network 10 and register for service as mobile user equipment.

At step 3, upon connection to the call center 7, the docking station 8 sends one or more messages to the call center agent or automated system that it will perform address validation. The docking station 8 supplies an identifier associated with that particular docking station. In one example, the identity of the landline is also provided via ANI or caller ID.

At step 4, the location server 24 receives, from the docking station 8, the request for validation of an address associated with the PERS device. An identifier associated with the docking station 8 may be used to look up the associated account in a database and display or otherwise indicate the address, registered landline number, and mobile directory number of the wearable unit 9. The location server 24 may verify that the ANI or caller ID matches the landline telephone number supplied at registration. The ANI or caller ID may also be used to obtain the address associated to the landline telephone number via reference to the MSAG 25. If the ANI or caller ID does not contain the registered landline number, or the address associated with the ANI or caller ID does not match the registration address, the correct address may be determined by the call center agent or an automated application 50.

At step 5, the agent or automation system may request an address update from the wireless network 10. For example, the address of the wearable unit 9 associated with the docking station 8 may be determined using methods similar to techniques set forth in U.S. patent application Ser. No. 12/432,983, entitled "Improving Location Determination in a Wireless Network," filed Apr. 30, 2009, and/or U.S. Pat. No. 7,826,830, which are hereby incorporated by reference. In certain examples, the location server 24 requests an address verification for the moveable landline device (e.g., the docking station 8 of the PERS device 1) from the wireless network 10 servicing a wireless device (e.g., wearable unit 9) within proximity of the moveable landline device (e.g., docking station 8). While the exact location of the docking station 8 and the wearable unit 9 may differ, in some examples, the location of the wearable unit 9 may be considered the current address of the docking station 8, so long as the wearable unit 9 is within range of the docking station 8. The location server 24 may find the network location of the cellular radio of the wearable unit 9, from its registration at step 2, and contact the wearable unit 9 to request its current address. Responsive to the request, the location server 24 may receive from the wireless network 10 address information (e.g., an address reverse-mapped by the PDE 23 from GPS coordinates provided by the wearable unit 9) for the wireless device (e.g., wearable unit 9). The location server 24 may return the obtained address to the call center 7.

At step 6, the address (e.g., in the form of map coordinates such as latitude and longitude) may be reverse-mapped as an address and stored as the current address of the moveable landline device, in association with an identifier for the moveable landline device, for determining the address of the moveable landline device during processing of a further call for the moveable landline device. This reverse-mapping may be used to compare the address information for the wireless device (e.g., wearable unit 9) and the address supplied by the MSAG lookup of the ANI or caller ID, and/or the registration address to determine whether the address for the docking station 8 or other moveable landline device is accurate.

At step 7, if there is a discrepancy or it is otherwise determined that the address associated with the moveable landline device is inaccurate (e.g., because the address associated with the moveable landline device represents a first address and the address information associated with the wireless device (e.g., wearable unit 9) represents a second address), the user may be requested to provide accurate address information and the address associated with the moveable landline device may be updated to include the user provided address information. Thus, the agent or automated system may update the MSAG 25 and/or account data, either automatically, or via a confirmation call to the user. At step 8, the call center 7 will respond to the docking station 8 that the address has been verified and that data records are consistent.

For VoIP service providers, a VoIP Provisioning Center (VPC) may allow more dynamic updating capabilities than those associated with the MSAG 25. Even so, additional verification may be desirable for a number of reasons. Thus, if the verification process indicates that the wearable unit 9 is located at a new address, it may be presumed that the docking station 8, which is within range of the wearable unit 9, has also moved. Such an indication may cause the call center agent to contact the user of the PERS device to verify the address. The user may affirm that the docking station 8 and the user have moved to the new address and that the user desires PERS service at that address.

While the disclosure herein describes address verification for PERS service, the same concepts could be used without PERS devices in any moveable landline device(s), such as the ATA 3 for use with VoIP. Likewise, the call center 7 may not be the same call center associated with the PERS service. In one such example, an A-GPS system may be installed in the ATA 3 such that powering up of the ATA 3 causes the ATA 3 to detect and report its address to a VPC. In such examples, the location server 24 may receive from the wireless network 10 address information including an address associated with a radio base station servicing a wireless device. The VoIP service provider may then automatically update the VPC with the address determined from the update, or contact the user to verify that the service address has changed. In either case, this could provide users of moveable VoIP telephone services with an accurate and timely method of registering the current address of their service with their telephone service provider.

Figure 7:
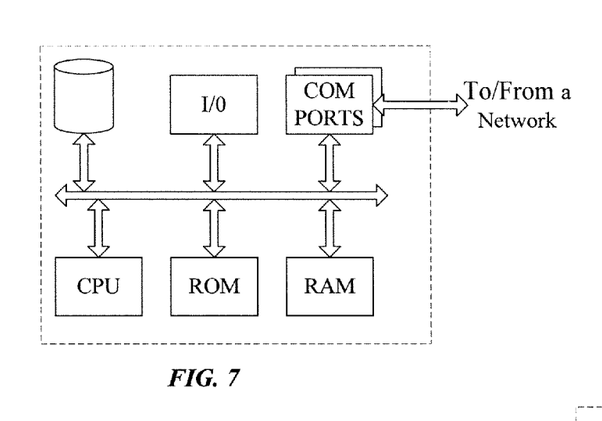
FIG. 7 is a simplified functional block diagram of a computer that may be configured as a host or server.
Figure 8:
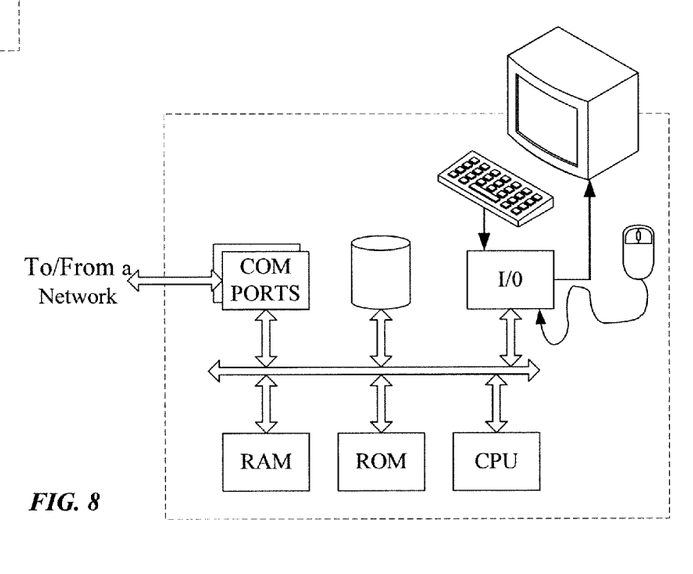
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server such as, for example, the location server 24 shown in FIG. 3. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the various polices, tables and managed information content. The software code is executable by the general-purpose computer that functions as the server and/or that functions as a client device.

In operation, the code is stored within the general-purpose computer platform. At other times, however, the software may be stored at other locations and/or transported for loading into the appropriate general-purpose computer system. Execution of such code by a processor or central proceeding unit of the computer platform enables the platform to implement the technique for the address verification, in essentially the manner performed in the implementations discussed and illustrated herein.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and client devices are conventional in nature, and it is presumed that those skilled in the art are adequately familiar therewith. Of course, the server functions may be implemented in a distributed fashion on a number of similar platforms, to distribute the processing load.

Hence, aspects of the present disclosure outlined above may be embodied in programming. Program aspects of the technology may be thought of as "products" or "articles of manufacture" typically in the form of executable code and/or associated data that is carried on or embodied in a type of machine-readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the address verification method, etc., shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer-readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

APPENDIX

Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

A-GPS—Assisted Global Positioning System
ANI—Automatic Number Identification
ATA—Analog Terminal Adapter
BSC—Base Station Controller
BTS—Base Transceiver System
CC Agent—Call Center Agent
CDMA—Code Division Multiple Access
CD-ROM—Compact Disc Read Only Memory
CPU—Central Processing Unit
DVD—Digital Video Disc
DVD-ROM—Digital Video Disc Read Only Memory
EPROM—Erasable Programmable Read Only Memory
EEPROM—Electrically Erasable Programmable Read Only Memory
EPC—Evolved Packet Core
FLASH-EPROM—Flash Erasable Programmable Read Only Memory
GMLC—Gateway Mobile Location Center
GPOSREQ—Geo Position Request
GPS—Global Positioning System
GSM—Global System for Mobile Communications
HLR—Home Location Registry
IMS—IP Multimedia Subsystem
ISPOSREQ—Inter System Position Request
LCS—Location Service
mPERS—Mobile Personal Emergency Response System
MDN—Mobile Directory Number
MLP—Mobile Location Protocol
MPC—Mobile Positioning Center
MSAG—Master Street Address Guide
MSC—Mobile Switching Center
MTA—Media Terminal Adapter
PDE—Position Determining Entity
PERS—Personal Emergency Response System
PROM—Programmable Read Only Memory
PSTN—Public Switched Telephone Network
RAN—Radio Access Network RAM—Random Access Memory
RF—Radio Frequency
ROM—Read Only Memory
SLIA—Standard Location Immediate Answer
SLIR—Standard Location Immediate Request
SMS—Short Message Service
SMSREQ—Short Message Service Request
STP—Signal Transfer Point
UMTS—Universal Mobile Telecommunications System
VLR—Visiting Location Registry
VoIP—Voice Over Internet Protocol
VPC—VoIP Provisioning Center

What is claimed is:

1. A method comprising:
receiving, from a moveable landline device and at a server, a Voice over Internet Protocol ("VoIP") telephone call, the moveable landline device being connected to a VoIP adapter that is configured to provide the moveable landline device with a telephony service over the Internet;
responsive to obtaining a telephone number associated with an origin of the telephone call, obtaining an address associated with the moveable landline device;
when the telephone call is received, requesting a verification for the address associated with the moveable landline device from a wireless network servicing a wireless device within proximity of the moveable landline device;
receiving, from the wireless network, address information for a location of the wireless device responsive to the address verification request; and
comparing the address information for the location of the wireless device with the address associated with the moveable landline device to determine whether or not the address of the moveable landline device is accurate.

2. The method of claim 1, wherein:
the moveable landline device and the wireless device are associated with a personal emergency response system;
the moveable landline device is a docking station and the wireless device is a wearable unit; and
the docking station includes a low-power radio transceiver for communication with the wearable unit when wearable unit is not docked in the docking station.

3. The method of claim 1, wherein:
the adapter includes a VoIP Analog Terminal Adaptor having an assigned telephone number and configured to provide the moveable landline device with telephone service; and
the assigned telephone number of the adaptor remains the same as the adaptor is moved from one address to another.

4. The method of claim 1, wherein receiving the telephone call includes receiving the telephone call at a startup of the moveable landline device.

5. The method of claim 1, wherein obtaining the address associated with the moveable landline device includes:
obtaining from the telephone call an identifier separate from the telephone number and associated with the origin of the telephone call; and
referencing a database to identify an address associated with the identifier.

6. The method of claim 5, wherein the identifier comprises an Automatic Number Identification (ANI).

7. The method of claim 5, wherein the identifier comprises caller Identification (caller ID).

8. The method of claim 1, further comprising subsequent to connection of the telephone call, receiving from the moveable landline device and at the server, a request for validation of an address associated with the moveable landline device.

9. The method of claim 8, wherein the request for validation is triggered by powering up of the moveable landline device.

10. The method of claim 8, wherein the moveable landline device comprises a wearable unit and a docking station; and wherein the request for validation is triggered by docking of the wearable unit with the docking station.

11. The method of claim 8, wherein the request for validation is triggered by the passage of a predetermined period of time.

12. The method of claim 8, wherein receiving from the wireless network the address information for the location of the wireless device comprises:
receiving, in a central processing system, a call from the moveable landline device and receiving coordinates, obtained from a global positioning system (GPS), of a wearable unit in radio communication with the moveable landline device; and
reverse-mapping the received coordinates into a current address of the moveable landline device.

13. The method of claim 8, wherein receiving from the wireless network the address information for the location of the wireless device includes receiving from the wireless network an address associated with a radio base station servicing the wireless device.

14. The method of claim 1, wherein when it is determined from comparing the address information for the location of the wireless device with the address associated with the moveable landline device that the address associated with the moveable landline device is inaccurate, the method further comprises:
requesting a user of the wireless device to provide accurate address information; and
updating the address with the moveable landline device to include accurate address information provided by the user in response to the request to provide the accurate address information.

15. An article of manufacture, comprising:
at least one non-transitory machine-readable storage medium; and
programming instructions embodied in the at least one medium for execution by one or more computers, wherein the programming instructions configures the one or more computers to be capable of performing functions, the functions comprising:
receiving, from a moveable landline device and at the one or more computers, a Voice over Internet Protocol ("VoIP") telephone call, the moveable landline device being connected to a VoIP adapter that is configured to provide the moveable landline device with a telephony service over the Internet;
responsive to obtaining a telephone number associated with an origin of the telephone call, obtaining an address associated with the moveable landline device;
when the telephone call is received, requesting a verification for the address associated with the moveable landline device from a wireless network servicing a wireless device within proximity of the moveable landline device;
receiving, from the wireless network, address information for a location of the wireless device responsive to the address verification request; and
comparing the address information for the location of the wireless device with the address associated with the moveable landline device to determine whether or not the address of the moveable landline device is accurate.

16. The article of manufacture of claim 15, wherein obtaining the address associated with the moveable landline device includes:

obtaining from the telephone call an identifier separate from the telephone number and associated with the origin of the telephone call; and referencing a database to identify an address associated with the identifier.

17. The article of manufacture of claim 15, the functions further comprising:

subsequent to connection of the telephone call, receiving from the moveable landline device and at the server, a request for validation of an address associated with the moveable landline device.

18. A system comprising at least one server, the at least one server comprising:

an interface for communication through a network;

a processor for controlling operations of the at least one server, including communications through the interface;

storage for user records and programming executable by the processor, wherein the programming configures the processor so that the system is capable of implementing functions including functions to:

receive, from a moveable landline device and at the at least one server, a Voice over Internet Protocol ("VoIP") telephone call, the moveable landline device being connected to a VoIP adapter that is configured to provide the moveable landline device with a telephony service over the Internet;

responsive to a telephone number associated with an origin of the telephone call, obtain an address associated with the moveable landline device;

when the telephone call is received, request an address verification for the moveable landline device from a wireless network servicing a wireless device within proximity of the moveable landline device;

receive, from the wireless network, address information for a location of the wireless device responsive to the address verification request; and compare the address information for the location of the wireless device with the address associated with the moveable landline device to determine whether or not the address of the moveable landline device is accurate.

19. The system of claim 18, wherein obtaining the address associated with the moveable landline device includes:

obtaining from the telephone call an identifier separate from the telephone number and associated with the origin of the telephone call; and referencing a database to identify an address associated with the identifier.

20. The system of claim 18, wherein the implemented functions further include functions to:

subsequent to connection of the telephone call, receiving from the moveable landline device and at the server, a request for validation of an address associated with the moveable landline device.

* * * * *